(12) United States Patent
Kuttruf et al.

(10) Patent No.: US 7,344,009 B2
(45) Date of Patent: Mar. 18, 2008

(54) HYDRAULIC CIRCUIT

(75) Inventors: Werner Kuttruf, Wuppertal (DE); Herbert Seeger, Bad Oeynhausen (DE)

(73) Assignee: Ortlinghaus-Werke GmbH, Wermelskirchen (DE)

( * ) Notice: Subject to any disclaimer, the term of this patent is extended or adjusted under 35 U.S.C. 154(b) by 250 days.

(21) Appl. No.: 10/560,419

(22) PCT Filed: May 29, 2004

(86) PCT No.: PCT/EP2004/005858

§ 371 (c)(1),
(2), (4) Date: Dec. 14, 2005

(87) PCT Pub. No.: WO2004/111466

PCT Pub. Date: Dec. 23, 2004

(65) Prior Publication Data

US 2006/0124423 A1    Jun. 15, 2006

(30) Foreign Application Priority Data

Jun. 17, 2003    (DE) ............................... 103 27 519

(51) Int. Cl.
*F16D 67/02*    (2006.01)
(52) U.S. Cl. ...................................... 192/15
(58) Field of Classification Search .............. 192/12 C, 192/15, 18 A
See application file for complete search history.

(56) References Cited

U.S. PATENT DOCUMENTS 3,415,161 A    12/1968  Mindrum ........................ 91/19
6,540,054 B1 *    4/2003  Evers et al. .............. 192/12 C

FOREIGN PATENT DOCUMENTS

| DE | 10 53 255 | 3/1959 |
|---|---|---|
| DE | 1 533 776 | 1/1970 |
| GB | 1 160 451 | 8/1969 |
| NL | 137877 | 1/1969 |

* cited by examiner

Primary Examiner—Dirk Wright
(74) Attorney, Agent, or Firm—Gudrun E. Huckett

(57) ABSTRACT

In a hydraulic circuit for controlling a clutch/brake system having a clutch that is disposed separately from the brake in a main drive of a mechanical press, wherein the brake is spring-loaded in a direction opposite to an engagement direction of the clutch, a piston/cylinder unit is provided that moves the clutch and the brake into a coupling position or a braking position, respectively. A pressure line connects a press safety valve to the piston/cylinder unit for generating torque at the clutch. A bidirectionally passable hydraulic connection connects a metering piston unit to the piston/cylinder unit in parallel to the press safety valve.

12 Claims, 2 Drawing Sheets

HYDRAULIC CIRCUIT

BACKGROUND OF THE INVENTION

The invention relates to a hydraulic circuit for controlling a system comprised of a clutch and a brake with separate clutch and brake in the main drive of a mechanical press, wherein clutch and brake are movable by a piston/cylinder unit between the coupling position and the braking position and wherein the piston/cylinder unit can be connected communicatingly to the pressure line by a press safety valve for torque generation at the clutch and wherein the brake is spring-loaded against the engagement direction of the clutch.

Such systems comprised of a clutch and a brake either have individual clutches and individual brakes or they are known in the form of a clutch/brake combination. For this reason, the clutch/brake combinations dealt with in the following also encompass all systems acting in the same way and being comprised of a clutch and a brake, since the invention is suitable for both embodiments.

Such hydraulic circuits serve for connecting mechanical presses either to a drive or for holding them by means of a brake in a standstill position, wherein the mechanical presses are used, for example, for producing carbody parts.

Since in this connection masses weighing tons are to be accelerated or to be a decelerated, the applicable safety standards require that in the case of power outage the braking function must cause standstill, if possible, within the range of a few hundredth of a second, while, on the other hand, correspondingly rapid engagement times for the clutch are to be realized when the press operation is to be started up again.

This requirement is to be viewed in connection with the transfer of the workpieces into the press so that very short stop times or acceleration times are desired.

However, these time periods cannot become arbitrarily short because this would lead to very high accelerations acting on the clutch and the brake and, as a result of this, on the entire drive strand of the machine so that the drive would be exposed to unacceptably high stress loads.

SUMMARY OF THE INVENTION

Despite of this, it is an object of the present invention to shorten the acceleration and stop times of such presses to such an extent that an increased loading of the drive is prevented.

The invention solves this object in that parallel to the press safety valve a metering piston unit is connected by a bidirectionally passable hydraulic connection to the piston/cylinder unit.

The invention has the advantage that the acceleration or stopping times of the clutch or the brake can be designed in the sense of a controllable load of the drive while at the same time the so-called delay time that is required for switching the clutch/brake combination from the coupling position into the braking position and vice versa is shortened.

The invention proposes only to transfer the clutch/brake combination faster between the coupling and braking positions while at the same time the time periods for generating the coupling moment or the brake moment remain unaffected by the increased transfer speed.

This advantage is achieved in that the volume of hydraulic oil that is required for the travel distance of the clutch/brake combination is determined by a metering piston unit that is active for the transfer of the clutch/brake combination into the clutch position as well as for the movement into the braking position. This is achieved in that the metering piston unit is connected by a bidirectionally passable hydraulic connection to the clutch/brake combination. In this way, the required quantity of metering volume that is needed for transfer of the clutch/brake combination within the delay time, respectively, can be used for both transfer directions so that subsequently the torque generation at the clutch or the brake can be realized by means of a conventional press safety valve.

The principal idea of the invention resides therefore in that the idle time for transfer of the clutch/brake combination from the coupling position into the braking position and vice versa is reduced and, subsequently, by a conventional press safety valve, the friction partners are moved into the required frictional engagement position.

When it is taken into consideration in this connection that for safety reasons the brake is always subjected to a mechanical spring load in such hydraulic circuits, so that, even when the hydraulic pressure fails, the mechanical press can be safely stopped, the return metering of the metered volume upon transfer of the piston/cylinder unit from the coupling position into the braking position is realized in a passive way while in the reverse direction it is realized actively by the metering piston unit so that the required filling of the piston/cylinder unit is highly precise and enabled in a range of a few milliseconds.

A further embodiment of the invention provides that the bidirectionally passable hydraulic line for filling and relieving the piston cylinder unit is to be provided with a greater nominal diameter in comparison to the discharge line of the press safety valve so that a flow resistance as small as possible results during transfer of the clutch/brake combination between the two end positions.

This measure is also beneficial for a reduction of the delay time without affecting the acceleration values of the drive.

A further advantage of the invention resides in that high pressure peaks are prevented because there are no pressure peaks associated with the back and forth movement of the metering volume between the metering piston unit and the piston/cylinder unit.

The bidirectionally passable hydraulic connection is therefore a hydraulic conduit that, upon transfer of the clutch/brake combination into the coupling position, is passed in one direction and, upon transfer into the braking position, is passed in the other direction, wherein at all times the required metering volume needed for the transfer flows back and forth.

For this reason it is expedient to design the bidirectional hydraulic connection to be free as much as possible of any narrow passages, bends or the like as a straight connection.

In this connection, the metering piston unit enables dimensioning of the metering volume with such a precision that, when reaching the respective metering volume, torque generation at the clutch or the brake is just not yet realized.

In this way, load peaks on the drive are reliably prevented because a sudden frictional contact between the friction partners of the clutch and the brake does not occur.

The coupling movement from the termination of supply of the metering volume to the complete frictional contact is realized by a conventional press safety valve.

The braking connection from the termination of returning the metering volume until reaching complete frictional connection is done conventionally by means of the pressure springs; optionally, as in the case of the clutch, an active control can be provided.

Expediently, the metering volume is determined at the metering unit within a transfer travel that is not determined by mechanical stops. This measure has the advantage that any mechanical wear on the metering piston unit is prevented. In the end areas of the metering stroke, a clearly defined acceleration or deceleration is obtained in this way.

In order to be able to easily adjust the metering volume to the differently sized cylinder volume of clutch/brake combinations, the limited stroke of the metering piston unit can be adjusted from the exterior.

This can be realized by a manually actuatable adjusting spindle or an electronically controllable motor.

In a preferred embodiment, the metering piston unit is provided with a main control circuit that is connected directly to the pump line while a hydraulic pilot control is present parallel to the main control circuit.

For this purpose, it is proposed that the main control circuit is provided with a greater nominal diameter than the pilot control circuit. In this way, the flow resistance in the main control circuit is smaller than in the pilot control circuit. Since the metering piston unit acts bidirectionally, the main control circuit will be provided with greater nominal diameters in the supply line as well as in the discharge line in order to enable fast supply and fast discharge.

Additionally, a positional control can be realized in order to take into consideration fluid-technological parameters such as temperature and viscosity that change during a working day so that the short delay time in accordance with the present invention can be complied with under all operating parameters.

In addition, a leakage compensation valve can be provided that refills the metering side of the metering piston unit in the case of an inner leakage so that the metering volume to be supplied can be maintained constant at all times.

As a result of the time that is saved according to the invention, for avoiding hydraulic peaks in the line system, the metering piston unit can be hydraulically dampened when approaching the end positions without this causing a significant time loss.

The saved time also enables that, for avoiding suddenly increasing braking moments and coupling moments that are to be expected within those times when the frictional contact is realized at the brake or the clutch, a pressure reducing valve can be provided, respectively, so that despite shortened delay time the loads acting on the drive are even reduced.

BRIEF DESCRIPTION OF THE DRAWINGS

In the following, the invention will be explained in the form of embodiments in more detail. It is shown in:

FIG. 3 braking time, delay time, acceleration time in a diagram.

DESCRIPTION OF PREFERRED EMBODIMENTS

If nothing else is indicated in the following, the following description applies to all Figures.

Figure 1:
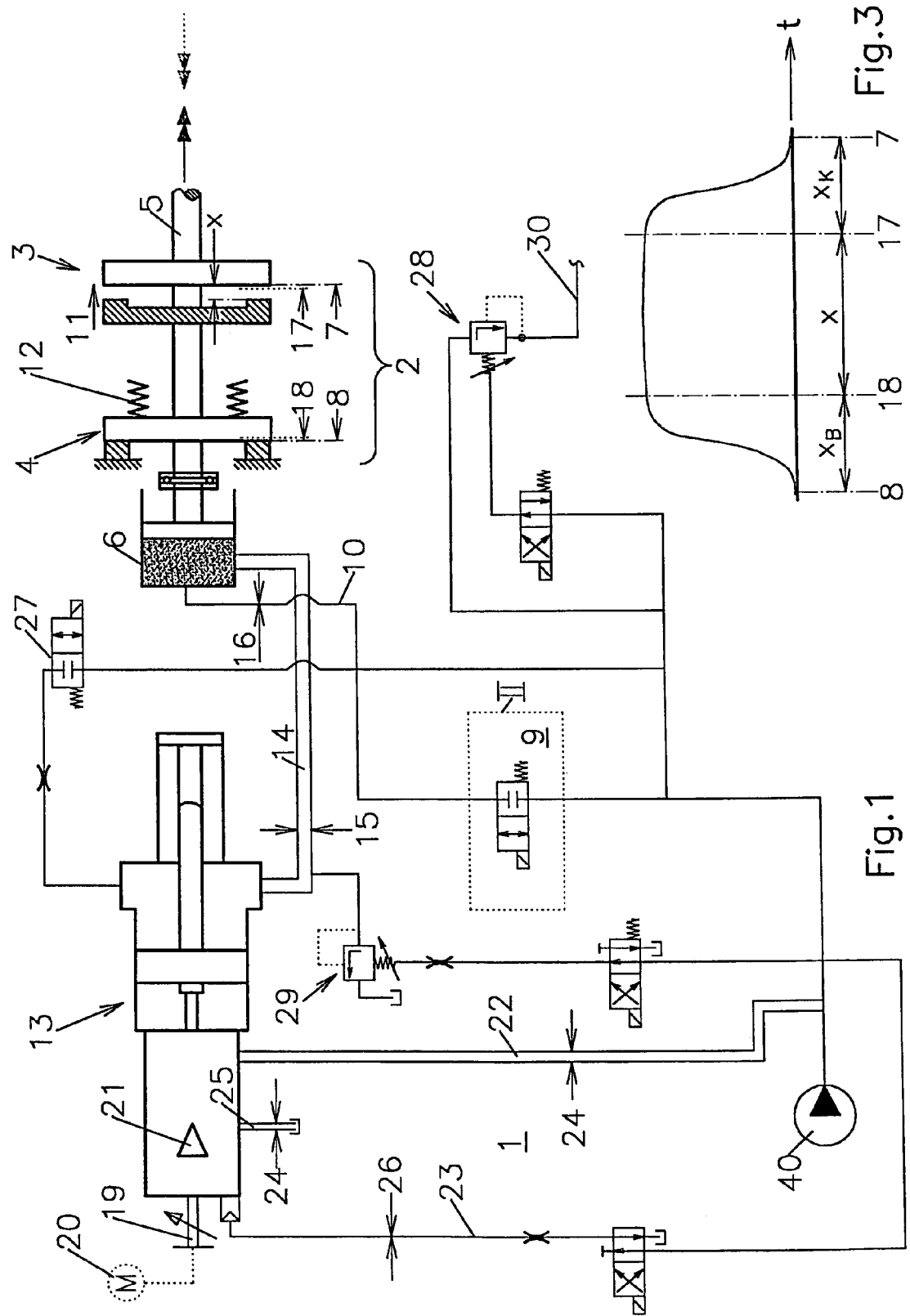
FIG. 1 a first embodiment of the invention,
FIG. 2 the schematically illustrated press safety valve of FIG. 1 with further details.

The Figures show a hydraulic circuit 1 for controlling a clutch/brake combination 2. The clutch/brake combination 2 has a clutch 3 and a brake 4. It is mounted in the main drive 5 of a mechanical press (not shown). The clutch/brake combination 2 is movable by a piston/cylinder unit 6 between a coupling position 7 and a braking position 8. This is realized by a hydraulic control of the piston/cylinder unit 6 by means of the press safety valve 9 that is illustrated only schematically in FIG. 1.

For this purpose, the pressure line 10 is provided that receives the hydraulic medium conveyed by the pump 40 through the press safety valve 9.

When the piston/cylinder unit 6 is loaded with hydraulic liquid, the clutch 3 moves into the engaged position 11. In order to do so, it must travel the distance X until it reaches the still torque-free end position 17.

In this torque-free end position 17 there is still no frictional contact yet between the two coupling partners.

In the opposite direction, the piston/cylinder unit 6 is loaded at all times by the pressure springs 12 as soon as the press safety valve 9 has been switched accordingly. Here, the brake also reaches first a torque-free end position 18 before it is moved by the pressure springs 12 into a frictional contact with the stationary machine frame in its braking position 8.

The displacement of the clutch/brake combination between the torque-free end positions 17 and 18 is to be realized by the metering piston unit 13.

For this purpose, the metering piston unit 13 is connected by a bidirectionally passable hydraulic connection 14 to the piston/cylinder unit 6.

It is schematically shown that the nominal diameter 15 of the bidirectionally passable hydraulic connection 14 is greater than the nominal diameter 16 of the discharge line 10 of the press safety valve 9 to the piston/cylinder unit 6.

In this way, for the same pressure larger volume flows can be transported by the metering piston unit within the same time window to the piston/cylinder unit 6 and vice versa; this is not necessary for the transfer of the clutch/brake combination between the torque-free end positions 17 and 18 and the corresponding end positions 7 and 8 so that the nominal diameter 16 of the pressure line 10 that is loaded by the press safety valve 9 can be correspondingly smaller.

Expediently, the bidirectionally passable hydraulic connection is free of any mounted inserts that would make the flow cross-section narrow or would impair flow. For this purpose, it is proposed to employ, if possible, a straight line connection that connects the metering chamber of the metering piston unit 13 to the hydraulic chamber of the piston/cylinder 6.

In addition, the metered oil volume is selected such that upon reaching the respective torque-free end positions 17, 18 of the clutch/brake combination there is not yet any frictional contact for torque generation at clutch 3 or brake 4.

In this connection, FIG. 3 illustrates schematically a time diagram within which the delay time between the torque-free end positions 17 and 18 is determined. It is shown that the torque-free end positions 17 and 18 practically do not allow any frictional contact yet between the friction partners of the clutch 3 and the brake 4, respectively.

Within the subsequent transfer of the clutch 3 or the brake 4 into the coupling position 7 or braking position 8, the respective frictional contact is generated and 1 completed until a positive connection (frictional connection) is established.

The metering piston unit 13 operates purely by volume control so that no mechanical end stops for the respective stroke limitation are required.

In the present case, the metering piston unit 13 has an adjusting device 19 on which the limited stroke can be adjusted from the exterior.

The adjustment can be realized manually or, as illustrated in dashed lines, by an adjusting motor 20. Preferably, an electronically controlled step motor is provided.

Moreover, the metering piston unit 13 has a control device 21 that is a position controller in order to control, in accordance with the preset nominal metering volume, possible deviations of the metering volume that are caused by changing fluid-technological parameters.

In addition, the metering piston unit 13 is connected to a supply line of the main control circuit 22 and is hydraulically pilot-controlled 23 parallel to the main control circuit 22. In this connection, the nominal diameter 24 of the main control circuit 22 and also of the discharge line 25 of the main control circuit 22 is greater than the nominal diameter 26 of the pilot circuit 23.

For compensating inner leakages, the leakage compensation valve 27 is provided that is connected with one side to the metering chamber of the metering piston unit 13 and with the other side to the pump 40.

The metering piston unit can be designed to be hydraulically dampened when approaching the end position. For this purpose, the metering piston unit, together with the controller 21, configured as a control valve, and the nominal value that is predetermined by the position of the adjusting device 19, provides a hydro-mechanical position control circuit. The P-control system passes by means of an exponential equation into the end position of the stroke that is predetermined by the adjusting device.

In addition, for reducing suddenly increasing braking and coupling moments pressure reducing valves 28 for the clutch or 29 for the brake can be provided. They are overpressure valves that are loadable in the opening direction by the respective pressure at the piston cylinder unit 6 and, as needed, are loaded in the closing direction by the pump pressure.

By reducing the suddenly increasing braking and coupling moments, these valves 28, 29 are loaded in the opening direction by the pressure of the piston/cylinder unit 6 and thus reduce sudden pressure increases of the piston/cylinder unit 6 accordingly.

Figure 2:
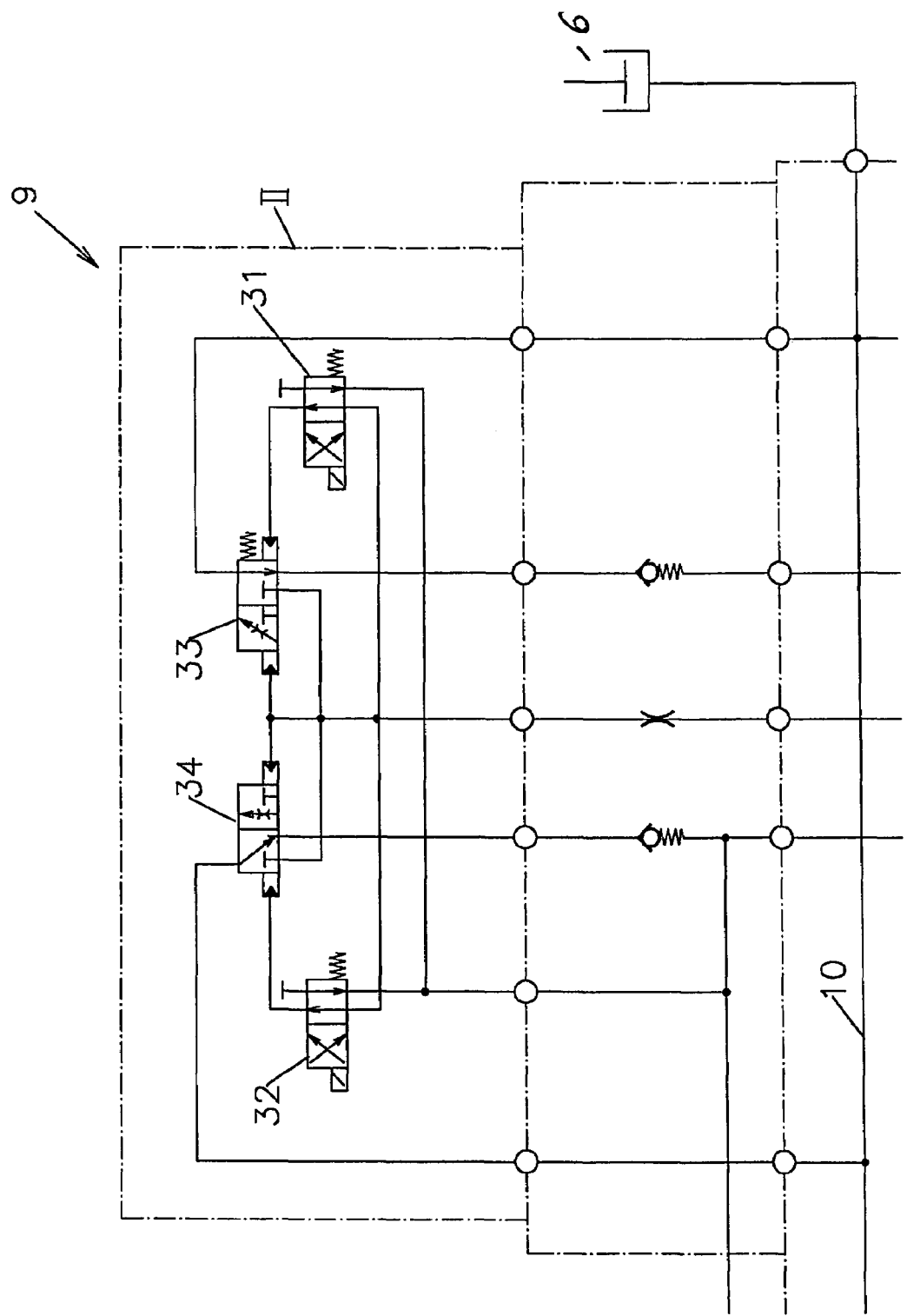

In addition, FIG. 2 shows a press safety valve 9 that is comprised of two redundant directional control valves 33, 34 that are hydraulically pilot-controlled.

The pilot control valves 31, 32 control the line pressure in accordance with their respective position toward the hydraulically pilot-controlled brake or clutch valves 33, 34 so that the brake or clutch pads positioned in the torque-free end positions 17 or 18 can be transferred into their braking position 8 or coupling position 7.

In this connection, the clutch 3 and the brake 4 are always in precisely defined end positions 7 or 8. The movement is realized therefore from the braking position 8 into the coupling position 7 and vice versa. Only a relatively small stroke 17c7 or 18c8 is required for moving from the torque-free end positions 17 or 18 into the coupling position 7 or braking position 8. This stroke is small in comparison to the stroke between the torque-free end positions 17c18 or 18c17 and can be considered separately because of the metering unit being employed for both directions. In this way, there is the possibility of controlling the accelerations or decelerations by means of hydraulic control through the press safety valve 19 in accordance with permissible loads of the machine while still realizing a time-optimized transfer from 8 to 17 or 7 to 18. These movements, thanks to the bidirectionally acting metering piston unit 13, are reproducible in both directions and are realized by defined accelerations or decelerations.

It is understood that when using a system of separate clutch and separate brake, the above explanations are to be employed accordingly wherein also two separate metering units with the same function can be employed in accordance with the present invention.

As an alternative to a separate bidirectionally passable hydraulic connection 14 to the piston/cylinder unit 6, the metering volume can flow at least partially through the discharge line 10 of the press safety valve 9 to the piston/cylinder unit 6.

LIST OF REFERENCE NUMERALS 1 hydraulic circuit
2 system comprised of clutch and brake
3 clutch
4 brake
5 main drive
6 piston/cylinder unit
7 coupling position
8 braking position
9 press safety valve
10 pressure line, discharge line of 9, pump line
11 engaging direction
12 pressure spring
13 metering piston unit
14 bidirectionally passable hydraulic connection
15 nominal diameter of 14
16 nominal diameter of 10
17 torque-free end position of 7
18 torque-free end position of 8
19 adjusting device
20 adjusting motor
21 controller
22 main control circuit, supply
23 pilot control circuit
24 nominal diameter of 22 or 25
25 main control circuit, discharge
26 nominal diameter of 23
27 leakage compensation valve
28 pressure reducing valve for 3
29 pressure reducing valve for 4
30 control line for pressure reducing valve of 3
31 pilot control valve
32 pilot control valve
33 hydraulically pilot-controlled brake valve
34 hydraulically pilot-controlled clutch valve
40 pump
X travel distance within the delay time
Xb travel distance within the braking time
Xk travel distance within the acceleration time

What is claimed is:

1. A hydraulic circuit for controlling a clutch/brake system comprising a clutch and a brake, wherein the clutch is disposed separately from the brake in a main drive of a mechanical press, wherein the brake is spring-loaded in a direction opposite to an engagement direction of the clutch; the hydraulic circuit comprising:

a piston/cylinder unit adapted to move the clutch and the brake into a coupling position of the clutch and a braking position of the brake, respectively;

a press safety valve;

a pressure line connecting the press safety valve to the piston/cylinder unit for generating torque at the clutch;

a metering piston unit;

a bidirectionally passable hydraulic connection connecting the metering piston unit to the piston/cylinder unit in parallel to the press safety valve.

2. The hydraulic circuit according to claim 1, wherein the bidirectionally passable hydraulic connection has a nominal diameter that is greater than a nominal diameter of the pressure line.

3. The hydraulic circuit according to claim 1, wherein the bidirectionally passable hydraulic connection is free of mounted inserts that reduce the flow cross-section.

4. The hydraulic circuit according to claim 1, wherein a metered oil volume provided by the metering piston unit is selected such that an end position of the clutch and the brake is reached, respectively, in which end position there is practically no torque being generated yet at the clutch or the brake.

5. The hydraulic circuit according to claim 4, wherein the metering piston unit is hydraulically dampened when the clutch and the brake approach the end position, respectively.

6. The hydraulic circuit according to claim 1, wherein the metering piston unit has a limited stroke without mechanical end stops.

7. The hydraulic circuit according to claim 6, wherein the limited stroke is adjustable externally.

8. The hydraulic circuit according to claim 7, wherein the limited stroke is adjustable by a motor.

9. The hydraulic circuit according to claim 1, wherein the metering piston unit has a main control circuit and a pilot control circuit arranged parallel to one another, wherein the main control circuit has a supply line and a discharge line that have a nominal diameter that is greater than a nominal diameter of the pilot control circuit.

10. The hydraulic circuit according to claim 1, wherein the metering piston unit has a control device comprising a hydro-mechanical position control circuit for controlling volume changes caused by a change in fluid-technological parameters.

11. The hydraulic circuit according to claim 1, wherein the metering piston unit is connected by a leakage compensation valve to the pressure line.

12. The hydraulic circuit according to claim 1, comprising pressure reducing valves for reducing suddenly increasing braking moments and coupling moments.

* * * * *